MULTI-CHANNEL MAGNETIC RECORDING SYSTEMS

Filed July 2, 1962 3 Sheets-Sheet 1

INVENTOR.
LESTER F. SHEW

BY Richard E. Cummins
ATTORNEY

June 28, 1966 L. F. SHEW 3,258,750

MULTI-CHANNEL MAGNETIC RECORDING SYSTEMS

Filed July 2, 1962 3 Sheets-Sheet 2

June 28, 1966 L. F. SHEW 3,258,750

MULTI-CHANNEL MAGNETIC RECORDING SYSTEMS

Filed July 2, 1962 3 Sheets-Sheet 3

INVENTOR
LESTER F. SHEW

BY [signature]

ATTORNEY

United States Patent Office 3,258,750
Patented June 28, 1966

3,258,750
MULTI-CHANNEL MAGNETIC RECORDING SYSTEMS

Lester F. Shew, Santa Clara, Calif., assignor to International Business Machines Corporation, New York, N.Y., a corporation of New York Filed July 2, 1962, Ser. No. 206,593
8 Claims. (Cl. 340—174.1)

This invention relates in general to magnetic recording systems and in particular to magnetic recording systems in which different transverse displacements exist between a magnetic transducer and a magnetic recording track.

In some magnetic recording systems intelligence is transferred to and from the magnetic medium by means of a transducer which is permanently associated with a given track. In other systems the transducer is selectively positioned to two or more tracks. The latter type of system is presently referred to in the art as a random access type storage system. One example of a random access type system would be where a magnetic disk is provided with a plurality of concentrically disposed, radially spaced recording tracks and the transducer is moved along a radial line by some positioning mechanism into operative relationship with a selected track, whereby intelligence is written or read from the track. Another example of the above type of system is where a magnetic drum is provided with a plurality of axially spaced recording tracks and intelligence is transferred to and from a selected track by physically moving the magnetic transducer transversely of the tracks by a positioning mechanism until the transducer is aligned with the selected track.

One of the major problems encountered in the movable transducer or random access type recording system is that of accurately repositioning the transducer to a given track since, under actual machine conditions, mechanical limitations, tolerances of the positioning mechanism and wear cause deviations in the position of the transducer relative to the track. In present day technology it is not uncommon to have track densities of 50 per inch, resulting in a center-to-center spacing of the tracks of 20 mils. It is economically impractical to provide a positioning mechanism which can position the magnetic transducer to, for example, 500 discrete positions spaced on 20 mil centers without allowing for some tolerance in each direction in the positioning operation. Generally, positioning mechanisms having a maximum tolerance around ±5 mils have been found economically acceptable.

When a single-gap magnetic transducer is employed in a random access type recording system to read signals from a track which have been written at some previous time, the transverse position of the transducer gap during the read operation does not necessarily correspond to the position that the gap assumed relative to the center line of the track during the previous write operation because of the allowable tolerances of the positioning mechanism.

A situation similar to this also occurs in recording systems in which a transducer is permanently associated with one given track. However, a problem is created by tolerances associated with the record member as distinguished from tolerances associated with the positioning mechanism. For example, when the record member comprises a drum, some axial movement of the drum occurs under actual machine conditions as a result of manufacturing tolerances and wear so that, while the transducer is permanently associated with a given track, recording and reproducing operations which occur at various times do not necessarily operate on the same track area. Likewise, where the record member comprises a multi-channel tape which is moved past a stationary multi-element transducer, tolerances in positioning the tape at the read-write station cause different transverse displacements of the transducer relative to a given track for recording and reproducing operations which occur at different times.

In both types of recording systems the transverse displacement causes two undesirable effects. The first effect is that the amplitude of the read-back signal decreases substantially in proportion to the amount of offset caused by the two positioning operations. In the previously mentioned example of ±5 mils positioning tolerances and a center-to-center track spacing of 20 mils, the decrease in the read-back signal is approximately 50% at extreme positioning conditions. The second and more serious effect is noise in the read-back signal caused by recorded data which was not completely modified during the previous recording operation and by data which may have been subsequently written on adjacent tracks.

In an attempt to solve the above defined problem a technique referred to as "write-wide, read-narrow" has been suggested by the prior art. In this technique a transducer having two separate gaps with different operating widths is employed. One of the gaps is used to write data on the recording medium while the other gap serves the function or reading data from the recording medium. The operative or effective width of the gap of a transducer is always greater than the actual width of the gap because of the fringing field effects. The difference in the actual width and the operative width of the transducer gap depends on several factors such as gap-to-surface spacing and thickness of the recording medium. However, the operative width of the gap may be readily determined in any recording system by well known methods. In recording systems employing the write-wide, read-narrow technique and decrease in the amplitude of the read-back signal is substantially lessened and the noise caused by unmodified data signals on its own track and by data signals recorded on adjacent tracks can be somewhat decreased. However, since the two gaps employed in the transducer cannot physically occupy the same space at any given time and since these gaps are spaced lengthwise along the track, there is a sacrifice in the recording area. Also additional circuitry is required to control the circuits connected to the transducer in order that the effective time delay associated with the gaps may be normalized. Further, since the amplitude of the read-back signal varies in proportion to its displacement from the center line, limitations are imposed on the circuit designer in handling the signals generated by the transducer.

Several modifications of the write-wide, read-narrow technique have also been suggested by the prior art but these usually require the use of two gaps.

The present invention provides an improved recording system in which a magnetic transducer having only a single gap may be employed for both recording and reproducing functions, with the result that the amplitude of the read-back signal is substantially independent of the amount that the center line of the transducer is displaced from the center line of the recording track, there is substantially no problem of noise in the read-back signal caused from portions of the track which were not modified on previous operations, and there is substantially no problem of noise from portions of the track which were magnetized during a recording operation on an adjacent track.

It is therefore an object of the present invention to provide an improved transducer recording system.

Another object of the present invention is to provide a recording system which employs only one gap for both recording and reproducing operations, and which can tolerate large transducer displacement with respect to a given track.

A further object of the present invention is to provide a recording system in which the amplitude of the read-back signal provided by the transducer for a given track is substantially constant regardless of whether the transducer is exactly centered on the track or offset transversely thereof to its maximum positioning tolerance.

A still further object of the present invention is to provide an improved recording system employing only a single gap for both recording and reproducing operations wherein the read-back signal for a given track when the transducer is not exactly centered is substantially unaffected by signals recorded on adjacent tracks subsequently to recording the given track.

A still further object of the present invention is to provide an improved single gap movable transducer recording system wherein the signal read from a given track when the transducer is not exactly centered on the track is substantially free from noise caused by signals previously recorded on the same track or on adjacent tracks.

The foregoing and other objects, features and advantages of the invention will be apparent from the following more particular description of a preferred embodiment of the invention, as illustrated in the accompanying drawings.

Figures 1, 2, 3:
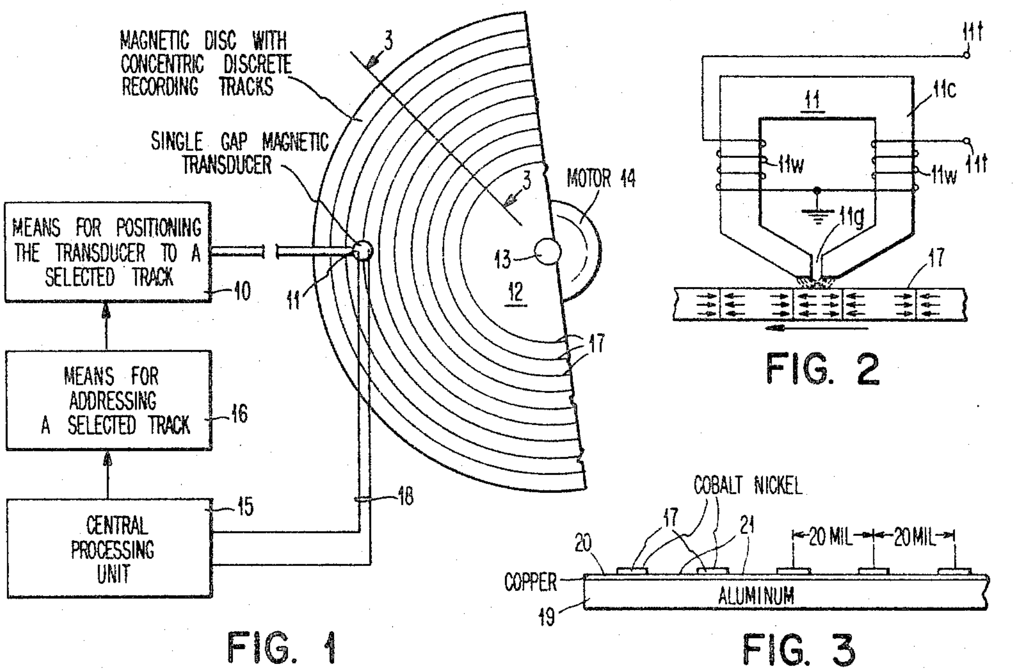
FIGURE 1 is a block diagram of a recording system embodying the present invention.
FIGURE 2 is an enlarged view of one type of single gap magnetic element that may be employed in the transducer shown diagrammatically in FIG. 1.
FIGURE 3 is a sectional view, taken along the line 3—3, of the magnetic recording member shown in FIG. 1.

The movable transducer recording system shown in FIG. 1 comprises generally a positioning mechanism 10, a transducer 11 and a magnetic record member 12 which is arranged for rotational movement relative to the transducer 11. Movement of record member 12, which in this instance is a circular disk, is achieved by means of the shaft 13 and motor 14. The recording system is shown in the environment of a digital data processing system wherein an address consisting of digital data is transferred from a central processing unit 15 to an address register 16 whose function is to control the operation of the positioning mechanism 10 so as to position transducer 11 in operative relationship with one of the discrete tracks 17 on record member 12 corresponding to the address. Data stored in the central processing unit may then be transferred to the selected or addressed track or data stored on the selected track may be transferred from the track to the central processing unit by conductors 18 under the control of the central processing unit in any conventional manner. The manner of addressing the address register 16 and the manner in which the transfer of data between the selected track and the central processing unit is controlled form no part of the present invention.

Any suitable mechanism which functions to position an element to one of a plurality of discrete positions selectively can be employed for the block designated 10 in FIG. 1. For example, the positioning mechanism shown in copending application Serial No. 55,994 filed September 14, 1960, now Patent No. 3,130,549, in the name of Marshall E. Freeman, entitled, "Hydraulic Positioning System," may be satisfactorily employed in the system shown in FIG. 1.

Similarly, various magnetic transducers known in the art may be employed for magnetic transducer 11 shown in FIG. 1. The magnetic transducer 11 shown on an enlarged scale in FIG. 2 is merely one example of a ring type magnetic transducer which may be employed. As shown in FIG. 2, transducer 11 comprises a core member 11*c* including a single gap 11*g* and a combined read-write winding 11*w*. As is well known, signals representative of intelligence supplied to the terminals 11*t* of winding 11*w* are recorded on the track 17 in terms of a portion of the track being magnetized to different extents or in different directions by action of the magnetic flux in gap 11*g* on the portion of the track 17 which passes under the head at a given time. As shown in FIG. 2, the data is recorded in terms of the direction of magnetization, transducer 11 operating to magnetize portions of the track 17 in accordance with the amplitude and polarity of the recording signal supplied to winding 11*w*. As is well known, the ring type transducer causes horizontal or longitudinal magnetization of the track. If desired, however, a probe type magnetic transducer, such as that shown in U.S. 2,920,379, "Perpendicular Magnetic Recording Head," issued January 12, 1960, in the name of J. J. Hagopian, could be employed in place of the transducer shown in FIG. 2, in which case portions of the track would be magnetized in opposite directions in the vertical plane.

A portion of the magnetic record member 12 shown in FIG. 1 is illustrated on an enlarged scale in FIG. 3. As shown in FIG. 3, record member 12 comprises the plurality of discrete recording tracks 17 which, in this instance, are uniformly spaced on centers having a 20 mil separation. Discrete magnetic tracks are known in the art and can be made by plating or coating. For example, as shown, an aluminum disk 19 was provided with a thin layer of copper 20 and then electroplated with ferromagnetic material, e.g., cobalt nickel, to a thickness of approximately 10 micro-inches. The discrete tracks 17 were obtained by photo-etching of the surface to provide the non-magnetic lands 21 shown in FIG. 3. If desired, the lands 21 may be left as shown in FIG. 3 or they may be filled with non-magnetic material. The term "non-magnetic" includes material which is diamagnetic or paramagnetic. Other processes known in the art may also be employed in the manufacture of member 12 having a plurality of discrete magnetic tracks 17 made of ferromagnetic material and non-magnetic lands separating adjacent tracks.

Figure 4:
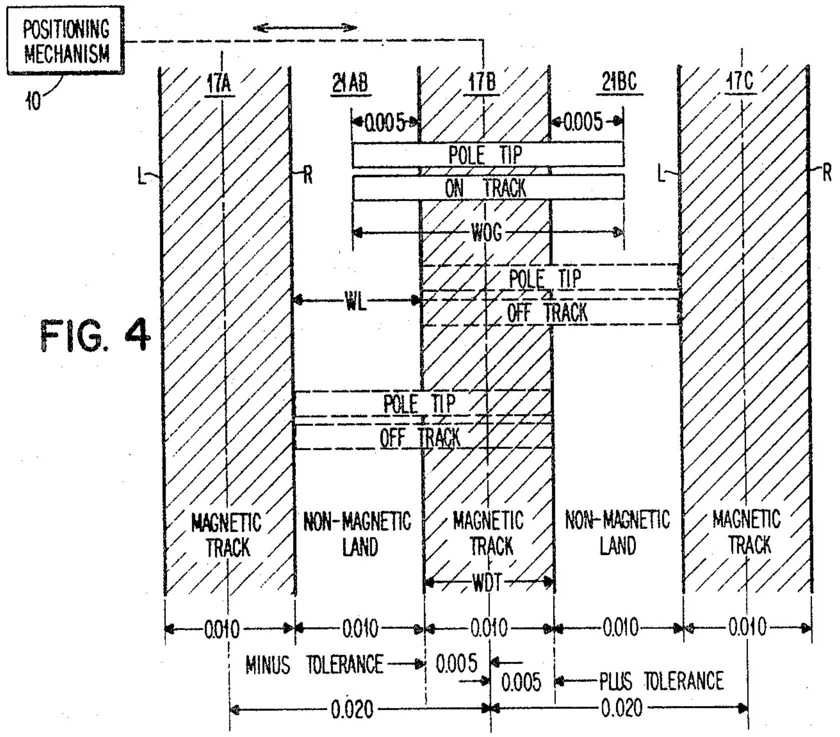
FIGURES 4, 5 and 7 are diagrammatic illustrations showing the relationships existing between the operative width or effective width of the gap of the transducer and the width of a magnetic recording track when positioning mechanisms having two different tolerances are employed in the system of FIG. 1.

In order to achieve an improved single-gap magnetic transducer recording system, the operative width or effective width of the gap of the magnetic transducer, the maximum tolerances of the positioning mechanism and the width of the recording track and track density must be inter-related in a particular manner as shown in FIG. 4. When the dimensions of any two of these independent variables are selected, a particular relationship must be established by dimensions of the other two variables. For example, as shown in FIG. 4, if tracks 17 have a density of 50 tracks per inch and mechanism 10 has a ±5 mil positioning tolerance, it can be seen that the minimum width of the land 21 or spacing between edges 17R and 17L of adjacent discrete magnetic tracks 17A and 17B must be 10 mils and is determined by the maximum positioning tolerance of 5 mils plus one-half of the difference between the actual width WDT of the discrete track 17 and the operative width WOG of the gap 11*g* of the transducer 11. Stated somewhat differently, the width WL of the land 21AB must be greater than the maximum positioning tolerance plus the amount that one side of the operative width WOG of the gap 11*g* of the magnetic transducer overhangs the edge of the discrete track 17 when transducer 11 is positioned with zero tolerance. Since the operative gap width should overhang the discrete track at least a minimum distance corresponding to the maximum positioning tolerances, the minimum width of land 21 can be established to be twice the maximum positioning tolerance of 5 mils, or 10 mils. It can also be seen in FIG. 4 that the operative width WOG of the transducer is equal to the sum of the plus and minus positioning tolerances and the width WDT of the discrete track. Since the minimum width of the land 21 is 10 mils and the track-to-track spacing is 20 mils, the maximum width of a discrete track is therefore 10 mils. The maximum operative width of the transducer for best performance should therefore not exceed 20 mils in the example shown in FIG. 4. If desired, the width of the discrete track 17 may be decreased, which would allow the operative width WOG of the gap 11g to be also correspondingly decreased.

Figure 5:
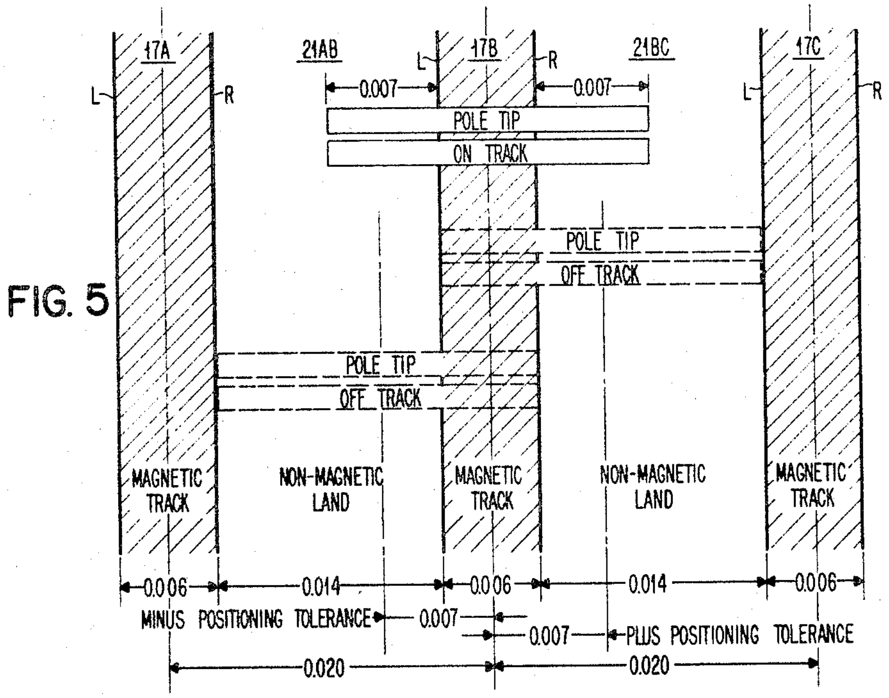
Figure 7:
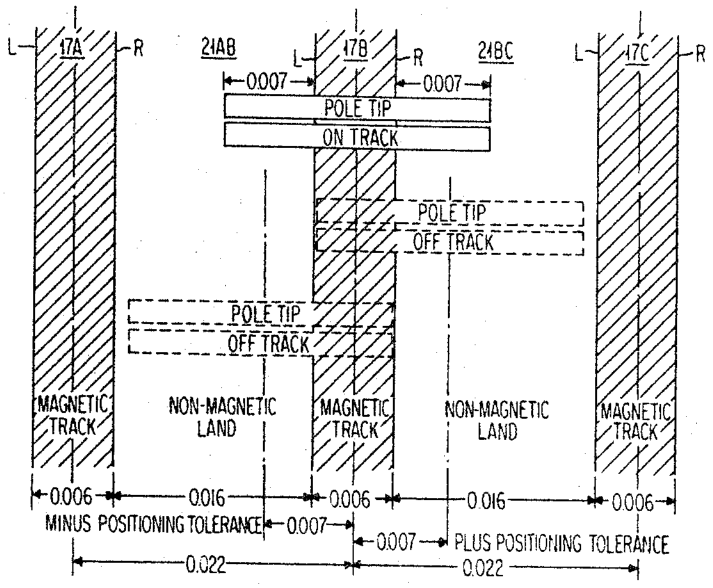

FIGS. 5 and 7 show other examples of the necessary relationships in a movable transducer recording system where the same track density of 50 tracks per inch is employed but a larger positioning tolerance of ±7 mils is used. With a ±7 mil positioning tolerance the minimum width of the land is 14 mils and the maximum width of the discrete track 17 therefore is only 6 mils. Employing the maximum width of the discrete track, the operative width of the transducer gap would not exceed a maximum of 20 mils for best performance. It will thus be seen that when the minimum land width is employed, as shown in FIG. 5, the operative width of the transducer gap corresponds to the track-to-track spacing. However, as shown in FIG. 7, the width of the land 21 may be greater than its minimum, in which case the operative width of the gap of the transducer is less than the center-to-center spacing of the tracks 17 but at least equal to or greater than the sum of the width WDT of the discrete track 17 and both maximum positioning tolerances. For example, in FIGURE 7, edge R of track 17A and edge L of track 17C illustrate how the width of lands 21AB and 21BC can be increased to 0.016 inch, which is greater than the specified minimum width of twice the maximum positioning tolerance. Track 17A and 17C need necessarily be moved to the left and right, respectively, a distance of 0.002 inch each in the example chosen; this is also illustrated in FIG. 7.

Figure 6:
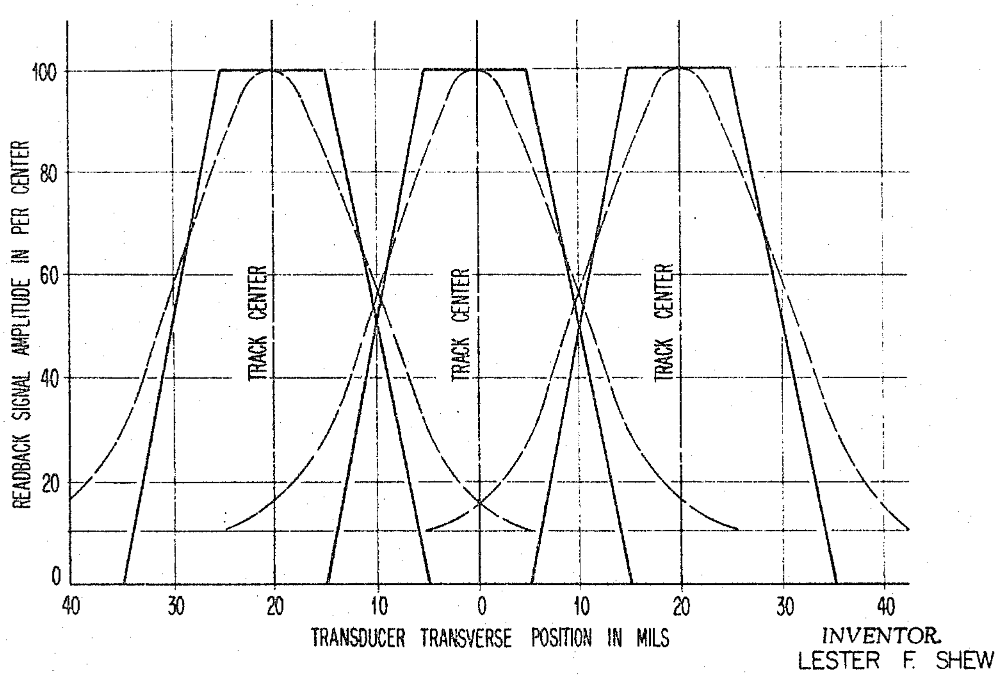
FIGURE 6 is a diagram illustrating the profile of the read-back signal for various transverse positions of the center line of the transducer relative to the center line of the track.

As was previously mentioned, in the improved movable transducer magnetic recording system shown in FIG. 1, when the above defined relationships are established, the amplitude of the read-back signal from a given track 17 is made constant for any positional error of the transducer up to the maximum tolerance. The manner in which this is achieved may be seen by reference to FIG. 6. FIG. 6 represents a graph the ordinate of which corresponds to the maximum value that the output signal attains in response to sensing a change in magnetic flux along the magnetic track. The transverse position of the gap relative to the center line of the track is plotted as the abscissa in FIG. 6. It will be seen that the output is substantially constant within positioning tolerances. This result is acheved solely by the combination of a discrete magnetic track 17 having ferromagnetic material, non-magnetic lands 21 on either side of the discrete track comprising diamagnetic or paramagnetic material and a magnetic transducer 11 having a gap 11g whose minimum operative width is equal to or greater than the width WDT of the discrete track 17 plus the positive and negative positioning tolerances but not more than the center-to-center spacing of adjacent tracks.

The dotted line in FIG. 6 illustrates the condition that would result if the operative width of the gap was the same as the track-to-track center spacing and a conventional record member was employed which had a continuous layer of magnetic material.

The manner in which noise is eliminated in the read-back signal, caused by signals subsequently recorded on adjacent tracks and by previously recorded unmodified signals on the selected track, may be pictured graphically by assuming a combination of positioning sequences to three adjacent tracks which would involve the maximum plus and minus tolerances and a critical sequence of recording and reproducing operations. However, such a presentation would not appear necessary since it should be readily apparent to those skilled in the art that, with the land comprising non-magnetic material, any write signals which might have been recorded on that portion of the record member accessible to the transducer as a result of addressing a pair of adjacent tracks are never recorded and so that portion does not create a noise problem during the reproducing operation.

While the invention has been particularly shown and described with reference to a preferred embodiment thereof, it will be understood by those skilled in the art that various changes in the form and details may be made therein without departing from the spirit and scope of the invention.

What is claimed is:

1. A magnetic recording system comprising the combination of
   - a record member having a plurality of discrete magnetic recording tracks, adjacent pairs of which have a predetermined center-to-center spacing,
   - a magnetic transducer,
   - means for mounting said magnetic transducer in operative relationship with at least one of said tracks with the respective center lines of the transducer and one track coinciding except for allowable plus and minus tolerances of said mounting means in directions transverse to the lengthwise direction of said track,
   - a non-magnetic land having a width which is not less than the sum of said maximum allowable plus and minus tolerances of said mounting means, disposed between each of said pairs of adjacent tracks,
   - said transducer having a single gap whose operative width during recording and reproducing operations is not less than the width of said discrete track plus said maximum tolerances and not greater than said center-to-center spacing of said tracks.

2. A magnetic recording system comprising the combination of
   - a record member having a plurality of discrete magnetic recording tracks, adjacent pairs of which have a predetermined center-to-center spacing,
   - a magnetic transducer,
   - a mechanism for selectively positioning said magnetic transducer in recording and reproducing relationship to each of said tracks repeatedly with the respective center lines of the transducer and selected track coinciding except for allowable plus and minus positioning tolerances in directions transverse to the lengthwise direction of said track,
   - a non-magnetic land having a width which is not less than the sum of said maximum allowable plus and minus positioning tolerances of said positioning mechanism, disposed between each of said pairs of adjacent tracks,
   - said transducer having a single gap whose operative width during recording and reproducing operations is not less than the width of said discrete track plus said maximum tolerances and not greater than said center-to-center spacing of said tracks.

3. A magnetic recording system comprising the combination of
   - a record member having a plurality of discrete magnetic recording tracks, adjacent pairs of which have a predetermined center-to-center spacing,
   - a magnetic transducer,
   - a mechanism for selectively positioning said magnetic transducer in recording and reproducing relationship to each of said tracks repeatedly with the respective center lines of the transducer and selected track coinciding except for allowable plus and minus positioning tolerances in directions transverse to the lengthwise direction of said track, a land having a width which is greater than the sum of said maximum allowable plus and minus positioning tolerances of said positioning mechanism, disposed between each of said pairs of adjacent tracks, said land comprising non-magnetic material, said transducer having a single gap whose operative width during recording and reproducing operations is greater than the width of said discrete track plus said maximum tolerances and less than said center-to-center spacing of said tracks.

4. The combination recited in claim 3 in which said record member comprises a circular disk and said discrete tracks are concentric with the center of said disk and have a uniform radial spacing.

5. The combination recited in claim 4 in which said disk includes a substrate member on which said discrete magnetic tracks are formed and said lands comprise non-magnetic material.

6. A magnetic recording system comprising the combination of a disk having a plurality of concentrically disposed, radially spaced discrete recording tracks, adjacent pairs of which have a predetermined center-to-center spacing, a magnetic transducer, a mechanism for selectively positioning said magnetic transducer in recording and reproducing relationship to each of said tracks repeatedly with the respective center lines of the transducer and selected track coinciding except for allowable plus and minus positioning tolerances in a direction transverse to the lengthwise direction of said track, a non-magnetic land having a width which is not less than the sum of said maximum allowable plus and minus positioning tolerances of said positioning mechanism, disposed between each of said pairs of adjacent tracks, said transducer having a single gap whose operative width during recording and reproducing operations is not less than the width of said discrete track plus said maximum tolerances and not greater than the radial spacing of said tracks.

7. The combination recited in claim 6 in which said disk includes a substrate layer on which said discrete magnetic tracks are plated, and said lands are defined by portions of said substrate which are not plated.

8. A magnetic recording system comprising the combination of a record having a plurality of discrete magnetic recording tracks, adjacent pairs of which have a predetermined center-to-center spacing, a magnetic transducer having a magnetic core element including a gap and winding means operable to transfer signals to and from a selected track, a mechanism for selectively positioning said gap in recording and reproducing relationship to each said tracks repeatedly with the midpoint of the operative width of said gap coinciding with the center line of said selected track except for allowable plus and minus positioning tolerances in directions transverse to the lengthwise direction of said track, a land having a width which is not less than the sum of said maximum allowable plus and minus positioning tolerances of said positioning mechanism, disposed between each of said pairs of adjacent tracks, said land comprising non-magnetic material, said gap having an operative width which is not less than the width of said discrete track plus said maximum tolerances and not greater than said center-to-center spacing of said tracks.

References Cited by the Examiner

UNITED STATES PATENTS 2,144,844 1/1939 Hickman ---------- 340—174.1

IRVING L. SRAGOW, *Primary Examiner.*

R. M. JENNINGS, A. I. NEUSTADT, *Assistant Examiners.*